US006382506B1

(12) United States Patent
Van Der Valk

(10) Patent No.: US 6,382,506 B1
(45) Date of Patent: May 7, 2002

(54) IDENTITY CARD, INFORMATION CARRIER AND HOUSING DESIGNED FOR ITS APPLICATION

(75) Inventor: Robert Willem Van Der Valk, Schoten (BE)

(73) Assignee: Chiptec International Ltd., Curacao (NL)

( * ) Notice: Subject to any disclaimer, the term of this patent is extended or adjusted under 35 U.S.C. 154(b) by 0 days.

(21) Appl. No.: 09/230,343

(22) PCT Filed: Jul. 24, 1997

(86) PCT No.: PCT/NL97/00443

§ 371 Date: Dec. 9, 1999

§ 102(e) Date: Dec. 9, 1999

(87) PCT Pub. No.: WO98/03941

PCT Pub. Date: Jan. 29, 1998

(30) Foreign Application Priority Data

Jul. 24, 1996 (NL) .............................................. 1003666
Aug. 14, 1996 (NL) .............................................. 1003802

(51) Int. Cl.[7] .................................................. G06K 5/00
(52) U.S. Cl. ........................................... 235/380; 902/5
(58) Field of Search ................................. 235/380, 379, 235/492, 1; 382/2, 4, 3, 56, 5; 380/4, 22–25, 49, 50; 705/67, 76, 18; 902/5

(56) References Cited

U.S. PATENT DOCUMENTS

| 4,709,136 | A | * | 11/1987 | Watanabe .................... 235/379 |
| 4,754,487 | A | * | 6/1988 | Newmuis ........................ 382/2 |
| 4,972,476 | A | * | 11/1990 | Nathans ........................ 380/23 |
| 5,015,830 | A | * | 5/1991 | Masuzawa et al. .......... 235/441 |
| 5,259,025 | A | * | 11/1993 | Monroe et al. ............... 380/23 |
| 5,337,358 | A | * | 8/1994 | Axelrod et al. ............... 380/23 |
| 5,420,924 | A | * | 5/1995 | Berson et al. ................ 380/23 |
| 5,514,862 | A | * | 5/1996 | Salzano ...................... 235/487 |
| 5,941,711 | A | * | 8/1999 | Iida et al. ................... 434/307 |
| 6,298,441 | B1 | * | 10/2001 | Handelman et al. ....... 705/67 X |

FOREIGN PATENT DOCUMENTS

WO        98/10363    * 12/1998    .................. 235/487

* cited by examiner

Primary Examiner—Michael G. Lee
Assistant Examiner—Jared J. Fureman
(74) Attorney, Agent, or Firm—Young & Thompson

(57) ABSTRACT

An identity card comprises an easy-to-use, more specifically card-shaped, information carrier provided with an electronically readable memory capable of digitally storing personal user data, including data concerning the user's physical features. The information carrier is installed in and can be removed from an input unit of a housing of comfortable dimensions. The housing has been provided with reading equipment which is capable of reading the personal data stored in the memory of the information carrier. Moreover, the housing has been provided with a screen for representing the data read.

7 Claims, 2 Drawing Sheets

IDENTITY CARD, INFORMATION CARRIER AND HOUSING DESIGNED FOR ITS APPLICATION

BACKGROUND OF THE INVENTION

The present invention concerns an identity card comprising an easy-to-use, more specifically a card-shaped, information carrier provided with an electronically readable memory which is capable of digitally storing personal user data including the user's physical characteristics.

At present, an identity card is usually a document issued by the government, such as a passport or a driving licence, or a proof of identity which is applied within a specific business environment or for a particular professional group. In all these cases, the identity card comprises a representation in the form of a passport photograph of a user in combination with the printed personal data of the user, However, this type of identity card has the disadvantage of being susceptible to fraud After all, the picture on the photo is the only indication that the data on the card belong to its user. The comparison between this picture and the actual appearance of the user is based on the subjective interpretation of the controlling officer, which may also be affected by the user's changes in appearance after the identity card was issued. In addition, this regular type of identity cards are to a varying degree susceptible to forgery, as well as to loss and theft.

Nowadays there are also identity cards known, which are based on memory cards, which may or may not be smart cards, as information carriers. An example of this has been described in U.S. Pat. No. 4,993,068. In this the external characteristics of the card user are written to the card's memory in encrypted form. In case of an access control the user's characteristics are recorded and compared with the information stored on the card by means of a central processing unit. Only if the data match is the desired access granted.

Although this means of identification in itself is highly reliable and fraud-proof, nevertheless a disadvantage lies in the fact that the implementation. requires relatively advanced and specifically suited equipment which will not be generally available everywhere. This makes this type of identity card only suitable for a closed circuit of users, e.g. a specific professional group or employees/co-workers within a particular business environment or (government) institution. This type of identity card, however, is less suitable as a travelling document because, for instance, it leaves no room for making notes, such as is required for visa, and, moreover, because the required equipment will not be available world-wide.

SUMMARY OF THE INVENTION

The present invention intends to provide for an identity card of the type as referred to in the introduction, which is highly fraud-proof and, nevertheless, has general applications, such as a travelling document which can be used world-wide without advanced ancillary equipment being absolutely required.

In order to achieve the intended objective a type of identity card according to the present invention, is characterised in that a removable information carrier has been installed in an input unit of a housing which is also easy to handle, that housing has been provided with reading equipment capable of reading the personal data stored in the memory of the information carrier and in that the housing is provided with representation means in order to represent the data read.

In this type of identity card the actual personal information and identification data are located in the memory of the information carrier. The identification data include. at least among others, the physical characteristics of a user, such as e.g. his picture, fingerprint, voice, iris etc. which are digitally stored in the memory. Provided that the appropriate equipment is available, a fully electronic comparison can be made with a digitised registration of the user by means of, for instance, a camera, a sensor (system) or another type of registration means which has been connected to an electronic identification system. To this end, the information carrier is removed from its housing and entered into reading equipment provided for in this identification system. In this way a fully automatic identification may take place in which the subjective interpretation of a controlling officer is avoided and the probability of mistakes related to this is eliminated. However, if this equipment is not available, e.g. in case of apprehension of the user on the street or in a country in which the infrastructure required for automatic identification is not up to standard, the housing of the identity card at least provides for the primary reading and representation means in order to be able. to at least establish the alleged identity of its user. In this way the invention provides for an identity card which is compatible with both modern, progressive identification methods and a more conventional method of identification.

In addition, a special embodiment of the identity card is according to the present invention characterised in that a sheet which may or may not be folded, is attached to. the information carrier, so that the identity card is also suited as international travelling document just as the present-day passport. In addition, the folder also leaves room for notes and stamps of the authorised government institutions such as visa and the like, possibly in combination with a printed version of the personal data as also registered in the memory of the information carrier, and a passport photograph of the user. In countries which have or will acquire a fully electronic identification system for their cross-border traffic, such as for instance described in this patent application these notes and visa, if desired, can be entered directly into the memory of the information carrier which will then make a folder superfluous. The folder, however, ensures that the identity card remains compatible with the identification procedures as presently applied world wide A further elaboration of the above-mentioned special embodiment of the identity card according to the present invention is characterised in that the information carrier is accompanied by a second information carrier with a sheet attached to it which may or may not be folded, in that both information carriers have been incorporated collectively in the input unit of the housing and in that both information carriers contain a unique encrypted code in a memory which can be electronically read, and in that means are present in order to establish a correspondence between the codes of both information carriers and signal a difference, if any, between both codes by means of the representation installation.

In this case, the primary identity card is formed by the first information carrier which is separated from the second information carrier, the latter is mainly intended to house the folder with notes and visa of the competent authorities, possibly in combination with a printed version. of the personal data as also stored in the memory of the first information carrier, together with a passport photograph. In the case of internal identification and also in the case of cross-border traffic of persons without a visa being required, the first information carrier will normally suffice. However, for those countries which require a written visa or other written notifications before access within the boundaries is granted, the second information carrier which contains a folder for written notes may be used. The unique codes of both information carriers ensure that the second information carrier can only be used in combination with the accompanying first information carrier. Attempted malversation in this respect can be punished by means of a signal from the housing of the identity card itself, or, if necessary, by means of rendering the second information carrier, whether or not permanently, defective if this carrier is linked to the housing of another information carrier than the appropriate first information carrier The second information carrier may just as the first information carrier be equipped with a central processing unit in combination with an electronically readable memory. A further embodiment of the identity card is according to tho present invention characterised in that the first information carrier. in addition to an electronically readable memory, also comprises a central processing unit and in that the second information carrier only contains an electronically readable memory. In this case, the second information carrier is only equipped with an electronically readable memory which results in considerable costs-saving. It is possible, for instance, to register all personal data in the memory of the second information carrier or only the unique code which indicates to which first information carrier the second one belongs.

In order to make it even more fraud-proof a further embodiment of the identity card according to the invention is characterised in that the information carrier is provided with one or more authenticity features, These authenticity features may for instance include characters punched through the card or other signs in the information carrier, and, for instance, a hologram on the card. In this way the genuineness of the identity card can be guaranteed even more and abuse can be combated.

A comparison of physical characteristics which are registered on site and stored in the information carrier of the identity card can be carried out in a fully electronic and automatic manner. In view of this a special embodiment of the identity card according to the invention is characterised in that the information carrier includes a central processing unit which has been provided with means for electric data transfer with a terminal unit of an identification system, and in that the central processing unit, which is fed with an effective programming code from the memory, is capable of comparing the stored external characteristics of the user with the external characteristics of the user registered on site. This type of identity card itself contains the processing unit required for the comparison to be carried out, and arithmetical ability, so that the identification system does no have to provide for this. The identification system will then only comprise registration means in order to incorporate specific physical characteristics of a user of the identity card, which registration means are linked up to the above-mentioned terminal unit from which the recorded data can be read by the processing unit of the identity card and subsequently, can be compared with the stored data in the identity card itself. This does not only simplify the infrastructure required al the check point location, but is also beneficial to the processing speed if various checks which otherwise possibly were to be managed by one processing unit only, are now executed in a parallel manner.

In order to avoid error messages as a result of external changes of the user as well as to enhance the processing speed of the comparison referred to above, a preferred embodiment of the identity card according to the present invention is characterised in that the personal data comprise the user's physical characteristics in parameters. Storage in parameters does not in the first place involve a picture of the user, but rather characteristic features like e.g. the eye to eye distance, the angles enclosed between eyes and nose or mouth, etc. Obviously, these external parameters of the user are less. subject to changes than e.g. wearing spectacles, beard and hair growth or the presence of make up, enabling a more reliable comparison.

In addition, other physical characteristics of the user, such as specific length and width measurements and fingerprint data, may also be registered in this manner, whether or not in combination with these. By means of combining and storing these in themselves independent physical features and checking these, a virtually 100% airtight access control may be achieved In this respect a special embodiment of the identity card is characterised in that, among others, the voice of the user is also stored digitally therein.

In order to protect the privacy and also in order to avoid forgery and falsification, the various data in the information carrier's memory are preferably stored in encrypted form. The data are thus protected against access by third parties and encryption by means of present-day encryption techniques may be also executed in such a complicated manner chat falsification or forgery of identity proof is almost impossible without specific knowledge of the applied key. Moreover, the data are preferably protected by means of at unique access code. Only the rightful user of the identity card knows this unique access code, e.g. in the form of a personal identification number (PIN), which makes it impossible for a subsequent holder to use the identity card and read the data with out knowledge of the access code.

BRIEF DESCRIPTION OF THE DRAWINGS

The invention will now be explained in further detail by means of an embodiment and an accompanying drawing. The drawing consists of.

DETAILED DESCRIPTION OF THE INVENTION

Figure 1:
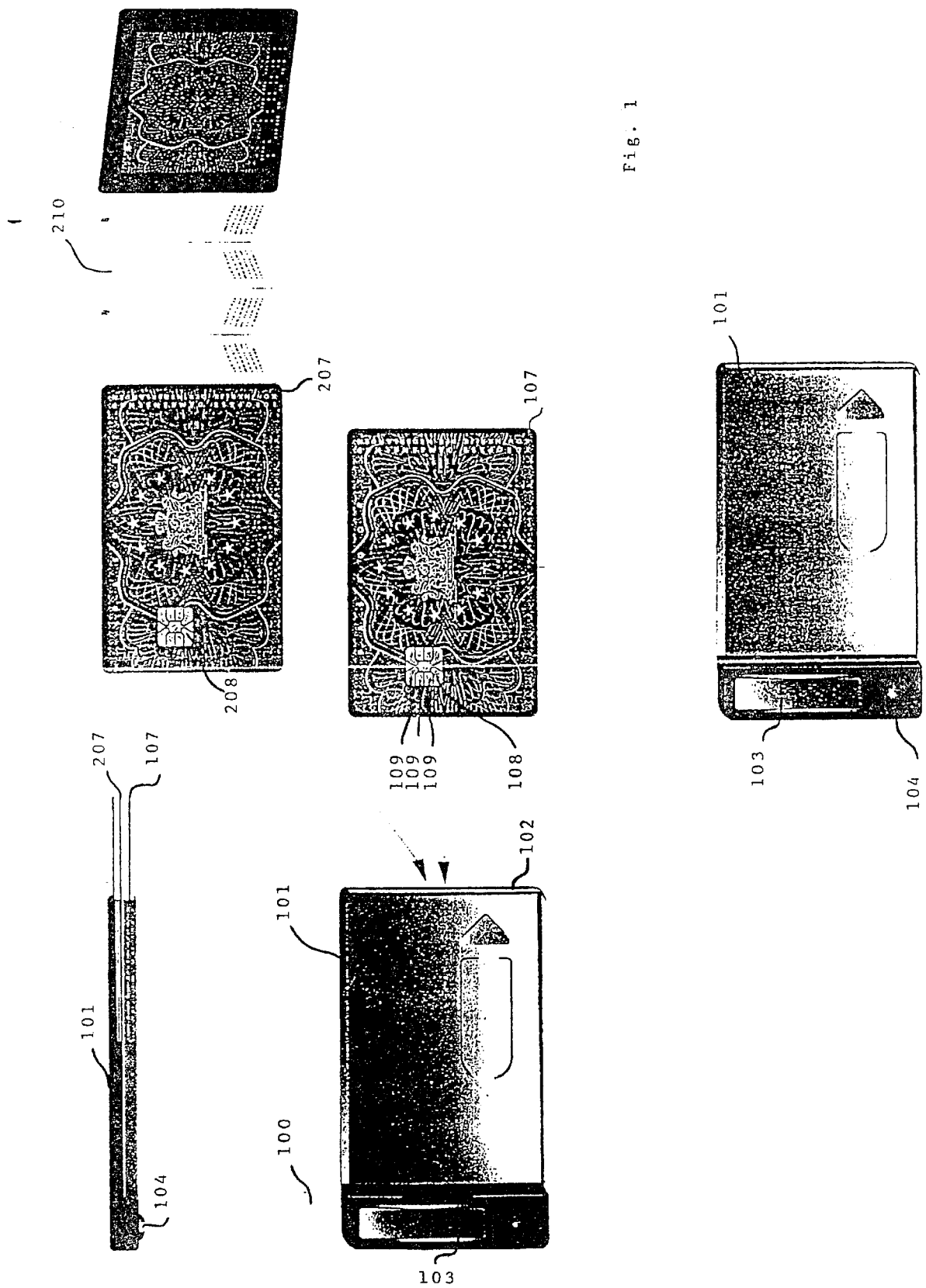
FIG. 1 showing a schematic view of a possible embodiment of an identity card according to the present invention.

The drawing as a matter of fact is purely schematic and not drawn to scale. Particularly, for clarity's sake, some dimensions have been represented in a strongly exaggerated manner. Corresponding parts have been indicated in the figure with the same reference number as much as possible.

The identity card of FIG. 1 comprises a card-shaped, synthetic housing 100 with an input unit 101 for entering an information carrier 107 which, in this case, is also card-shaped just as the housing. The interior of the input unit 101 of the housing has been equipped with electric contacts which are able to cooperate with similarly applied contact surfaces 109 of an integral circuit 108 which has been connected to or installed in the information carrier 107. In addition, the housing comprises an electric feeding which, among others, takes care of the necessary electricity supply to the card by means of some of the above-mentioned contacts. Moreover, the housing 100 contains an installation for image representation linked to a screen 103 and reading equipment by means of which the data stored in the memory of the information carrier 107 can be read to be represented on the screen. If desired, one may, for that matter, opt for an audio representation instead of or in addition to the visual representation.

In practice, a number of personal data in combination with one or more of the user's physical characteristics will be stored in the memory of the information carrier 107 enabling the personal data to be represented on the screen 103 without the necessary ancillary equipment. This makes it possible to apply the identity card world-wide, By means of a command key 104 installed on the housing for this purpose the various personal data can be checked one by one, so that a relatively small screen will suffice for the representation of all relevant personal data.

The identity card in this example comprises in addition to the first information carrier 107, also a second information carrier 207 which has been provided with a folded sheet 210 suited for making notes. This sheet leaves room for notes by the competent authorities e.g. visa, so that the identity card according to the present invention is also suitable as a valid travelling document. During use both information carriers are collectively entered into the housing which has been designed with the appropriate internal dimensions. The second information carrier also comprises an integral circuit 208 with at least an electronically readable memory. In this memory a unique code has been stored in encrypted form; this code is also present in the memory of the first information carrier. The identity card will only function if the codes in both information carriers 107, 207 fully correspond; in case of any differences this will be represented in the screen 103 as an error code. If desired, the processing unit on the first information carrier 107 may also be programmed in such a way that a faulty second information order to immediately combat any fraudulent attempts.

An electronically readable memory in the second information carrier in itself suffices and it is not necessary to also provide for a central processing unit. In order to save costs, the second information carrier in this case has therefore been designed with an electrically programmable memory only, a so-called PROM, whereas the first information carrier also contains a full microprocessor in order to execute the identity control and activate the screen 103 of the housing.

Figure 2:
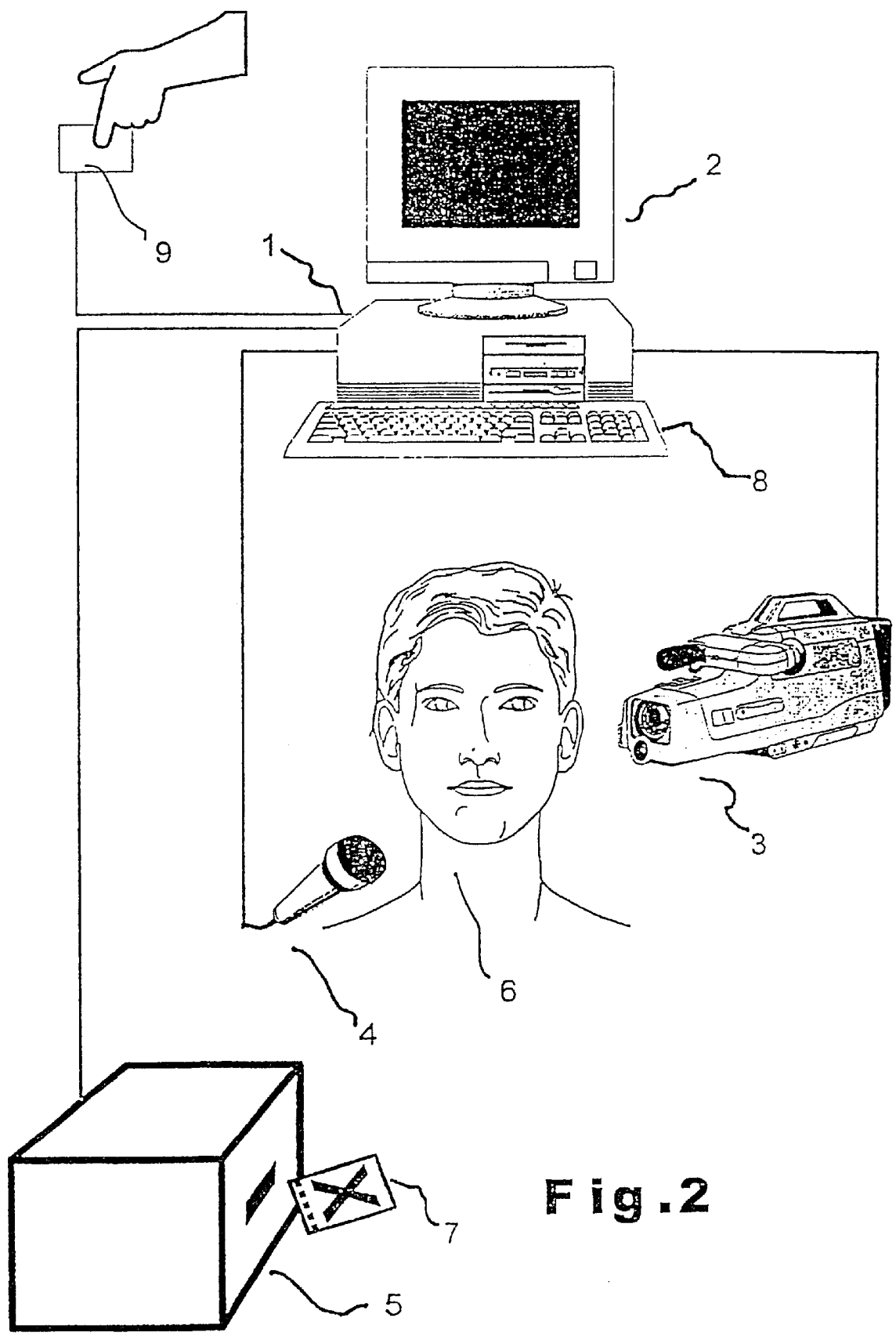
FIG. 2 which shows a schematic elaboration of an exemplary embodiment of an identification system for the application of an identity card according to the present invention.

An identification system to be used in combination with the identity card according to the invention has been schematically represented in FIG. 2 this identification system comprises a central processing unit in the form of a computer 1 which has been connected to both a screen 2 and registration tools in order to register the features, either external or not, of a person to be identified 6. In this example the registration tools comprise a camera 3 and a microphone 4, as well as a sensor 9 by means of which a fingerprint can be read. In addition to this, a terminal unit 5 has been connected to the computer 1.

In order to identify a person 6, this person's picture is recorded with a camera 3 and this person's voice is recorded with a microphone 4. Moreover, a fingerprint is taken electronically by means of the sensor 9 and then digitised. The analogue signal which is emitted from microphone 4, is digitised and analysed by computer 1 after which the digital voice data are sent to terminal unit 5. The picture registered by the camera, whether or not processed, is sent by the central computer 1 to terminal 5 in a similar fashion. In this case, a digital camera 3 is assumed, but within the framework of the invention an analogue camera may just as well be applied in which case its picture is digitised by means of well-known techniques such as a frame grabber in combination with an analogue-digital converter.

The person to be identified 6 has an identity card according to the invention consisting of a card-shaped information carrier 7 of handy credit card dimensions, of the type as referred to above. The information carrier 7 has been manufactured from synthetic material and contains an integral circuit linked to an electronically readable memory. Such a carrier is generally referred to ass chip card, smart card or similar names. The memory of the card 7 contains the personal data of the user 6 recorded in digital form, including data concerning the physical features and in this case, in addition to a digital passport photograph and personal data, the user's voice and fingerprint as well. The information carrier 7 is manually entered into the slot of the terminal unit after which the data from the computer 1 are transferred to the card 7. These data are processed in the card by means of the integral circuit and compared to the stored personal characteristics. To this end, the integral circuit comprises a central processing unit which is activated by an appropriate program code which is loaded onto the card from the memory. In addition to this, the circuit comprises reading equipment in order to read the personal data stored in the memory of the card. Thus card 7 comprises all means for fully executing the actual identification on the card itself. The results of the identification procedure may be represented visually, e.g. on screen 2, acoustically or both acoustically and visually. Screen 2 may also serve to represent the user's passport photograph 6 as read from card 7, so that the controlling officer of service is also able to execute a manual identification control.

For that matter, the various personal data of card holder 6, such as name, address and permanent domicile or place of residence, as well as birth register data, eye colour, length, etc., possibly in combination with a passport photographs may, in addition to registration in the card's memory, of course also be registered on the card 7 in the conventional Away enabling a quick identity control of the user on the basis of these data. Furthermore, the card may also be provided with e.g. an indication of the country or company, whether or not in combination with the according logo and authenticity features, such as for instance particularly a hologram or characters punched into the card, in order to combat forgery.

The personal data in the card's memory 7 comprise various characteristic external features in parameters, particularly concerning the user's external features 6, in order to minimise the influence of cosmetic changes in the user's external features 6 and to enhance the processing speed. These features may include the eye to eye distance, the enclosed (tri)angle between eyes on the one hand, and nose, mouth or chin on the other hand, the relative position of the ears and the like. Characteristic features like these are not or hardly influenced by the use of make up changing beard or hair growth, glasses and other cosmetic external changes which often considerably hinder a conventional identification.

In order to protect the stored personal data, especially in the case of loss or theft, the card 7 can be linked to a unique access code which the user 6 is to enter first before identification takes place and the personal data are made accessible. Entering this access code may take place by means of the key board 8 of the computer unit 1 or the system may be expanded with a separate input unit designed for this use. For increased protection the personal data are stored in encrypted form so that the data cannot be read outside of the integral circuit of the card. The present-day encryption techniques allow for encryption which is so adequate that decoding without knowledge of the encryption key applied is virtually impossible.

In this way the invention provides for a highly efficient and reliable identification system, using an identity card according to the present invention which can be applied on a large scale, not only as official travelling documents such as a passport, driving licence, visa, etc. but also within secured institutions such as company premises and, last but not least, military premises.

Although the invention has been clarified by means of this exemplary embodiment only, it goes without saying that the invention is by no means restricted to this one embodiment. On the contrary, many variations and embodiments can be realised by an average professional in this area without him being required to go beyond the scope of the invention. If desired, the invention may in this way be expanded by further registration tools in order to establish features, whether or not external, of the person to be identified, or the registration tools may, for instance, be restricted to only a camera or sensor (system) in order to record the picture, the fingerprint or eye characteristics. Instead of a more advance chip card, it is also possible to use, less complex card-shaped or otherwise shaped body as information carrier which, however, may contain a memory which can only be read by means of the terminal. Processing and comparing the to personal data will in this case entirely take place outside of the card itself, e.g. in the system's central computer unit as described above.

The data transfer in the terminal may take place by means of physical contact between the electrical contacts on the card on the one hand and in the terminal on the other hand. However, it is also possible to transfer the data without the contacts. in which case the transfer for instance, takes place optically, by means of radiography or induction.

The invention may also be applied more broadly than within the strict sense of person identification only, which use is restricted to obtaining the user's identity. The invention may for instance be incorporated in credit cards, cash cards and the like, for the purpose of verifying the data of its rightful user. To this end, the card in question will not only be equipped with data and/or software enabling the desired payments to be made, but also with digital personal data and characteristics in accordance with the invention. If the card is used, the identity of the user will then be determined, e.g. on the basis of a scan or the fingerprint or a recording of the external characteristics, and the payments can only be made after this has been electronically confirmed. In this way the invention provides for a virtually fraud-proof means of payment, which, among others, is not susceptible to loss or theft and the like. More over the identity card according to the present invention can also be programmed in such a way that it is suited as multiple identity card for various environments, For instance as travelling document, driving licence, and proof of access for one or more company premises or events. Moreover,the housing of the identity card according to the present invention is not restricted to the example given. It may for instance be expanded by a sound generator in order to enable an audio, or even spoken representation or signaling. One may also apply a more sophisticated screen in order to e.g. fully represent a passport photograph stored in the memory of the information carrier. In addition, the single command key may be replaced by a number of similar keys or even a full numeric or alphanumeric key board for the purpose of making the control of the identity card even more comfortable.

In short, the invention provides for an intelligent identity card which has no or hardly any restrictions when it comes down to ease of operation, protection against fraud and usability.

What is claimed is:

1. An identity system comprising:
    a card-shaped information carrier having an electronically readable memory capable of storing a user's personal data in digital form including data concerning physical characteristics of the user;
    a housing having (a) an input unit for receiving the information carrier, (b) reading means capable of reading the personal data stored in the memory of the information carrier and (c) representation means for representing the data read; and
    a second information carrier having a sheet attached, both information carriers jointly accommodated in the input unit of the housing, and a unique encrypted code stored in both carriers in an electronically readable memory, and means available to establish code correspondence of both information carriers and to signal the difference by means of a representation installation.

2. The system according to claim 1 wherein the card-shaped information carrier in addition to an electronically readable memory, also comprises a central processing unit and that the second information carrier only contains an electronically readable memory.

3. The system according to claim 1 wherein the personal data comprise the user's external characteristics in parameters.

4. The system according to claim 1 wherein the personal data have been protected by means of a unique access code.

5. The system according to claim 1 wherein the card-shaped information carrier further comprises further comprises one or more authenticity features.

6. The system according to claim 1 wherein the card-shaped information carrier comprises a central processing unit having means for electric data transfer with a terminal unit of an identification system, and in that the central processing unit, activated by means of an adequate program code from the memory, is capable of comparing the user's external features as stored in the memory to the user's external features recorded on site.

7. The identity system of claim 1, wherein the housing is approximately the same size as the card-shaped information carrier.

* * * * *